United States Patent [19]

Saillant et al.

[11] 4,049,877
[45] Sept. 20, 1977

[54] THERMOELECTRIC GENERATOR

[75] Inventors: Roger B. Saillant; Neill Weber, both of Dearborn, Mich.

[73] Assignee: Ford Motor Company, Dearborn, Mich.

[21] Appl. No.: 614,289

[22] Filed: Sept. 17, 1975

[51] Int. Cl.$^2$ .............................................. H01M 6/36
[52] U.S. Cl. ..................................... 429/11; 429/101; 429/104; 429/112; 429/218; 429/221; 429/223; 427/252
[58] Field of Search ............. 136/6 F, 6 FS, 20, 83 R, 136/83 T, 100 R, 86 R; 427/252; 429/11, 101-104, 112, 218, 221, 223

[56] References Cited

U.S. PATENT DOCUMENTS

| 3,458,356 | 7/1969 | Kummer et al. | 136/83 R |
| 3,533,848 | 10/1970 | Winn | 136/83 R X |
| 3,535,163 | 10/1970 | Dzieciuch et al. | 136/83 R X |

OTHER PUBLICATIONS

Weber, N., "A Thermoelectric Device Based on Beta-Alumina Solid Electrolyte"; Energy Conversion, vol. 14, No. 1, 1974.

Primary Examiner—Anthony Skapars
Attorney, Agent, or Firm—Roger L. May; Keith L. Zerschling

[57] ABSTRACT

An improved thermoelectric generator of the type having (1) enclosure means for a first reaction zone; (2) enclosure means for a second reaction zone; (3) a reaction zone separator which (a) separates and essentially completes enclosure of the two reaction zones and (b) comprises a cationically-conductive, solid electrolyte that is essentially impermeable to elemental alkali metal and compounds thereof and ionically conductive with respect to cations of the alkali metal; (4) alkali metal within the first reaction zone and in fluid communication with the solid electrolyte; (5) an electrode within the second reaction zone in electrical contact with the solid electrolyte and sufficiently porous to permit alkali metal vapor to pass therethrough; (6) conduction means for electron flow between the alkali metal within the first reaction zone and the electrode; (7) inlet means for introducing the alkali metal into the first reaction zone; and (8) temperature control means adapted to maintain a temperature in the first reaction zone at least 100° C in excess of the lowest temperature in the second reaction zone. The improvement of the invention comprises employing as the electrode a porous film of a metal which has a melting point above about 1000° C and which is chemically inert to sodium, the film having been deposited on said reaction zone separator by chemical vapor deposition.

22 Claims, 4 Drawing Figures

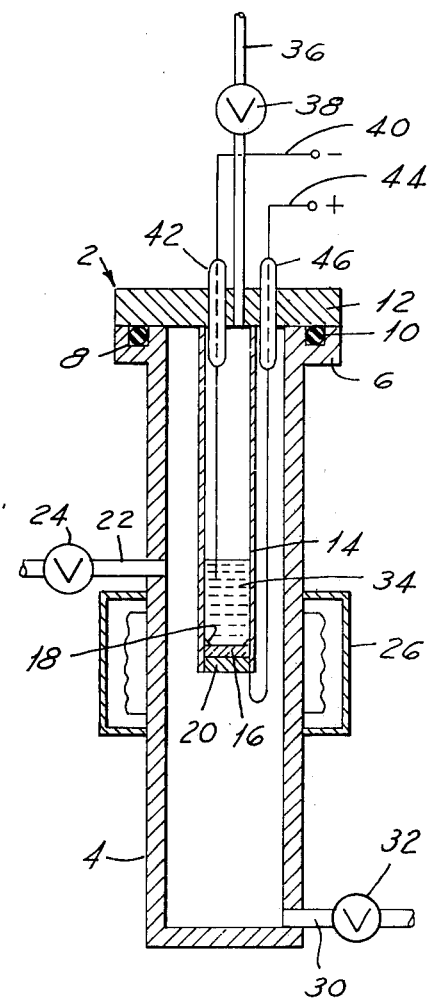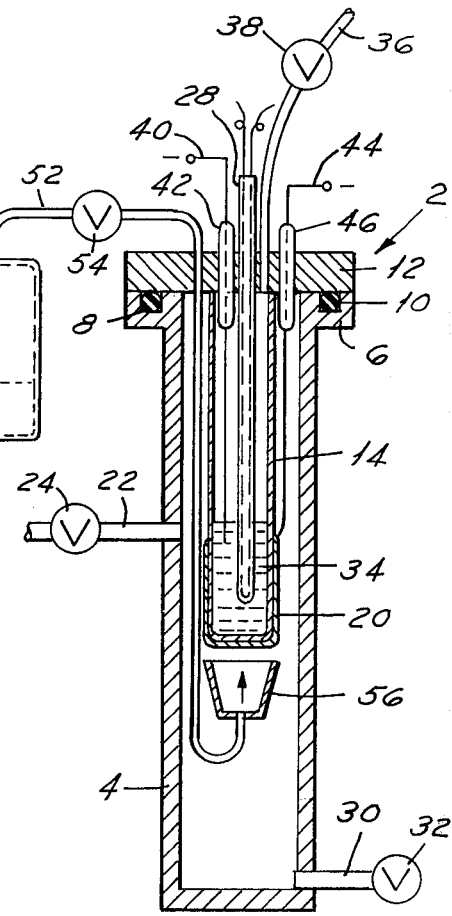

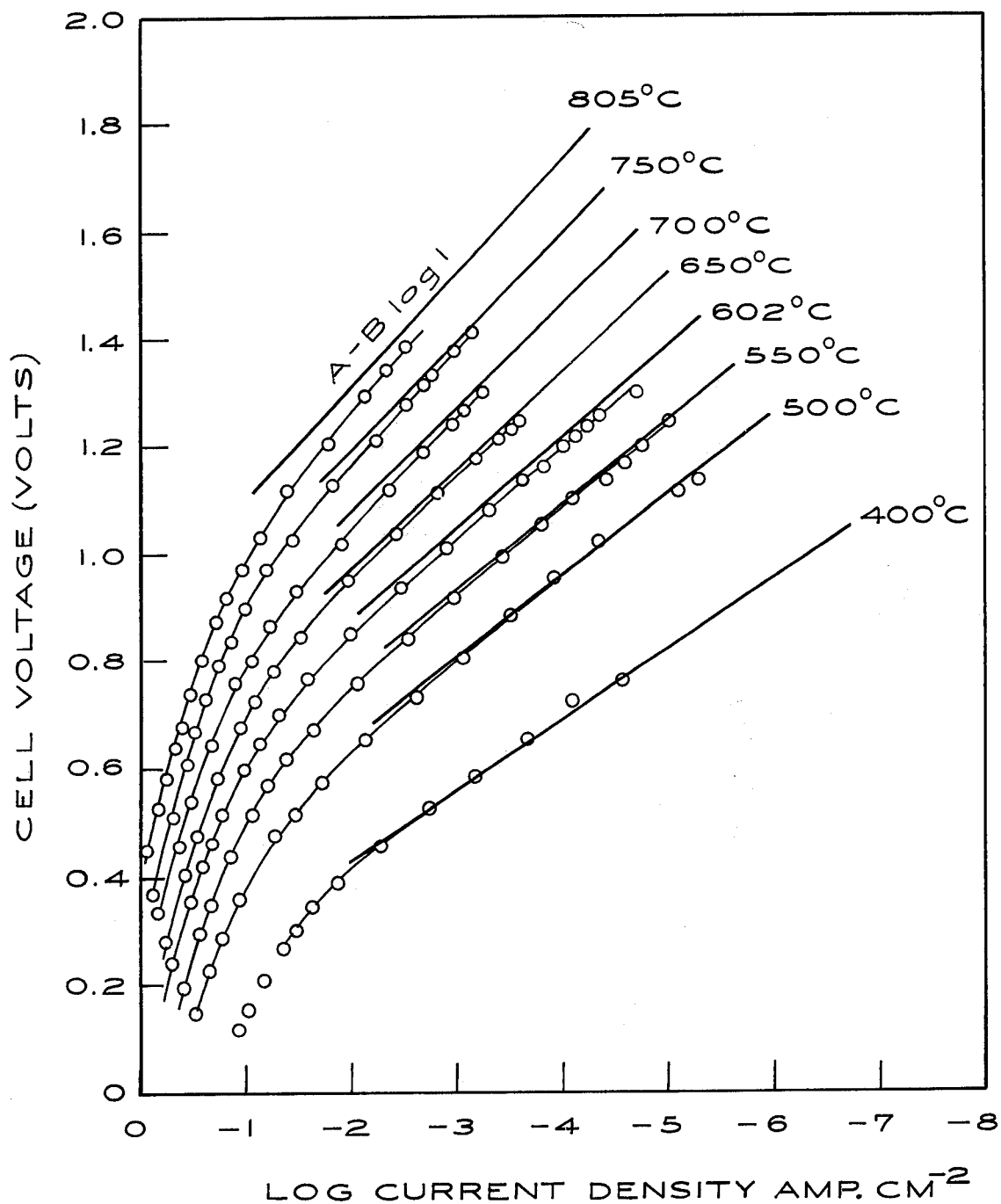

THERMOELECTRIC GENERATOR

This application relates to an improved thermoelectric generator for converting heat energy to electrical energy.

More particularly, this application relates to an improved thermoelectric generator which employs an alkali metal as the working fluid.

Still more particularly, this application relates to a thermoelectric generator with an improved porous metal electrode.

BACKGROUND OF THE INVENTION

A recently developed type of thermoelectric generator for converting heat energy into electrical energy comprises: (1) first and second reaction zones; (2) a reaction zone separator which (a) separates and essentially completes enclosure of said first and second reaction zones and (b) comprises a cationically-conductive, solid electrolyte that is essentially impermeable to elemental alkali metal and compounds thereof and ionically conductive with respect to cations of said alkali metal; (3) alkali metal within the first reaction zone and in fluid (i.e., liquid and/or vapor) communication with the solid electrolyte; (4) an electrode within the second reaction zone in electrical contact with the solid electrolyte and sufficiently porous to permit alkali metal vapor to pass therethrough; (5) conduction means for electron flow between the alkali metal within the first reaction zone and the electrode; (6) inlet means for introducing the alkali metal into the first reaction zone; and (7) temperature control means adapted to maintain a temperature in the first reaction zone at least 100° in excess of the lowest temperature in the second reaction zone.

In such a device the alkali metal working fluid which is supplied to the first reaction zone is maintained at a pressure $P_2$ which is greater than $P_1$, the pressure in the second reaction zone. During operation of such a device the working fluid, e.g., sodium, passes from the first reaction zone to the second and, where the device includes means for pumping the alkali metal back to the first reaction zone the alkali metal completes a closed cycle. Starting in the high pressure region a heat input raises the incoming liquid alkali metal to temperature $T_2$. The alkali metal then migrates through the solid electrolyte as a cation as a result of the vapor pressure differential $(P_2-P_1)$ across the membrane. Electrons left behind leave the $P_2$ region via the negative electrode. On passing through the solid electrolyte membrane, the alkali metal ions are recombined with electrons at the electrode-electrolyte interface, the electrons meanwhile having passed through the electrical load. Neutral alkali metal evaporates from the porous electrode at pressure $P_1$ and temperature $T_2$ passing in the gas phase to condense at a temperature $T_1$ ($T_1 < T_2$) in the second reaction zone, thus completing the cycle. The process occurring in the electrolyte and at its interface is nearly equivalent to an isothermal expanison of the alkali metal from pressure $P_2$ to $P_1$ at temperature $T_2$. No mechanical parts move, and the work output of the process is electrical only.

As is clear from the above discussion, the porous electrode of the thermoelectric generator serves an important function in the operation of the device. The electrode serves three important functions: (1) it must conduct electrons; (2) it must permit diffusion of alkali metal; and (3) it must make electrical contact with the solid electrolyte. Since the porous electrode performs such critical functions, the selection of the porous electrode material will have a significant effect on the efficiency of the device. In order to maximize the efficiency of the thermoelectric generator it, thus, is the objective of this invention to provide a porous electrode material which will perform the above functions in the most efficient manner.

BRIEF DESCRIPTION OF THE INVENTION

The aforementioned objective is achieved in accordance with the improvement of this invention by employing as the porous electrode a porous film of a metal which (1) has a melting point above about 1000° C (2) is chemically inert to sodium and (3) is deposited on at least one side of the reaction zone separator of the device by chemical vapor deposition.

As used herein, chemical vapor deposition means a method of plating in which deposits are produced by heterogeneous gas-solid or gas-liquid chemical reactions at the surface of a substrate. More particularly, chemical vapor deposition includes the thermally and/or catalytically activated chemical decomposition or reaction of a vapor resulting in the formation of elemental metal and/or metal carbide. A preferred method for depositing the porous film used in the improvement of the invention comprises the chemical vapor deposition of a metal carbonyl.

The invention will be more fully understood after reading the following detailed description of the invention in conjunction with the drawings in which:

FIG. 1 is a vertical cross-sectional view of one embodiment of a thermoelectric generator to which the improvement of this invention may be applied;

FIG. 2 is a vertical cross-sectional view of a second embodiment of a thermoelectric generator to which the improvement of this invention may be applied, the drawing also showing a device suitable for applying the porous metal film in accordance with the invention:

FIGS. 3 and 4 are plots of cell voltage against the log of the current density for two devices embodying the improved porous electrode of the invention.

DETAILED DESCRIPTION OF THE INVENTION

Figure 4:
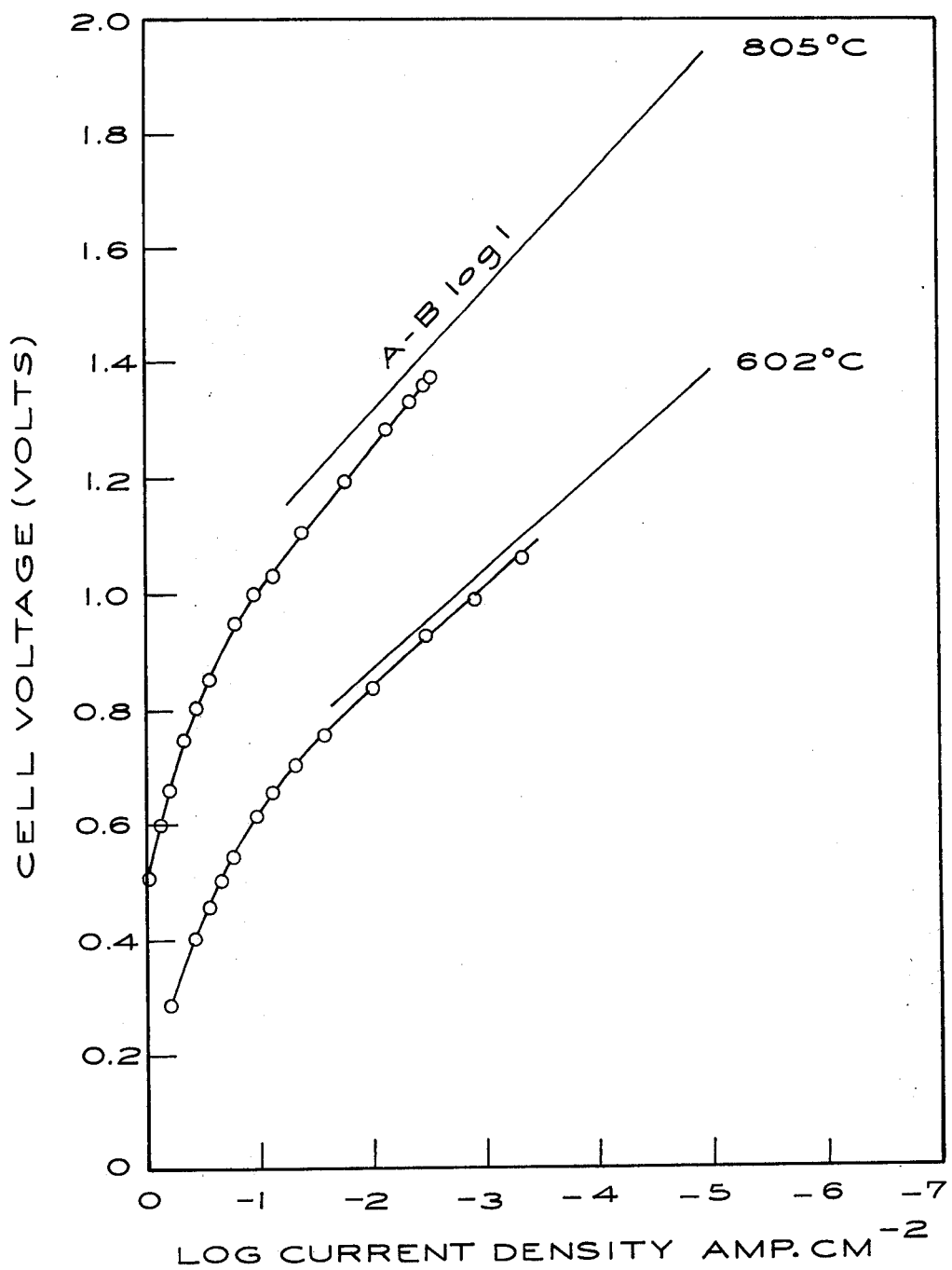

Description of Device to Which Improvement Applies

The thermoelectric generator to which the improvement of this invention applies is disclosed generally in U.S. Pat. No. 3,458,356, the disclosure of which is incorporated herein by reference.

As mentioned above, the thermoelectric generator to which the improvement of this invention applies comprises: (1) enclosure means for a first reaction zone; (2) enclosure means for a second reaction zone; (3) a reaction zone separator which (a) separates and essentially completes enclosure of the two reaction zones and (b) comprises a cationically conductive, solid electrolyte that is essentially impermeable to elemental alkali metal and compounds thereof and ionically conductive with respect to cations of the alkali metal; (4) alkali metal within the first reaction zone and in fluid communication with the solid electrolyte; (5) an electrode within the second reaction zone in electrical contact with the solid electrolyte and sufficiently porous to permit alkali metal to pass therethrough; (6) conduction means for electron flow between the alkali metal within the first reaction zone and the electrode; (7) inlet means for introducing the alkali metal into the first reaction zone; and (8) temperature control means adapted to maintain a temperature in the first reaction zone at least 100° C in excess of the lowest temperature in the second reaction zone.

The device may be described by referring to FIGS. 1 and 2 where thermoelectric generators shown in vertical cross section are generally indicated at 2. Each device is housed in a chemically resistant vessel 4, e.g. stainless steel, ceramic, etc. Vessel or tube 4 has a flange 6 at its open end. Flange 6 is provided with a groove or channel 8 in which rests gasket 10 which provides a vacuum-tight seal when cover plate 12, which is formed of stainless steel or other chemically resistant material, is secured to tube 4 by thread, bolt or other conventional attaching means, not shown. Positioned inside tube 4 and affixed to cover plate 12 is a smaller tube 14. In the embodiment shown in FIG. 1 tube 14 is formed, for example, of material similar to that of tube 4 and is open ended. The open end of tube 14 is closed by circular plate 16 which is formed of the cationically conductive solid electrolyte hereinafter described in detail, and which is essentially impenetrable to said alkali metal in the elemental state. Vacuum-tight seals 18, e.g. glass, ceramic, metal, etc., secure plate 16 to tube 14 and prevent passage of fluids between plate 16 and tube 14. In the embodiment shown in FIG. 2 tube 14 is closed ended and is formed, at least in lower portions thereof, entirely of the aforementioned solid electrolyte.

The lower edge of plate 16 in the device of FIG. 1 and the bottom and sides of tube 14 in the device of FIG. 2 are provided with a thin conductor 20 which is porous enough to permit sodium to pass therethrough and sufficiently thick and continuous to conduct electricity. Conductor 20 is shown disproportionately thick in relation to other components to facilitate its location and identification.

Tube 4 is provided with an outlet conduit 22 having a valve 24. A vacuum pump, not shown, is connected to conduit 22 for reducing pressure in tube 4.

Each of the devices is also provided with temperature control means. In the device of FIG. 1 a heater 26 is disposed about tube 4. In the device of FIG. 2, heater 28 is disposed within tube 14 and may be immersed in the molten sodium or a heater well, not shown, employed.

Tube 4 in each device is further provided with an outlet conduit 30 with valve 32 for removing liquid from tube 4.

Tube 14 is partially filled with alkali metal 34, e.g. sodium. An inlet conduit 36 and valve 38 provide means for introducing molten alkali metal 34 into tube 14. A negative lead 40 to an external circuit, not shown, extends through insulator 42 and into molten alkali metal 34. Insulator 42 extends through cover 12. Positive lead 44 to the external circuit passes through an insulator 46 which extends through cover plate 12 and is in electrical connection with conductor 20.

In operation of the device, heat is converted directly to electrical energy. Tube 4 is evacuated by pumping means through conduit 22 to a pressure lower than about 0.1 torr, and preferably lower than about 0.01 torr, and then sealed. Alkali metal 34, e.g. sodium, in tube 14 is heated to a temperature of 300° or greater, e.g. 300° to 800° C, while the lower end of tube 4 is maintained at least 100° C below that temperature, e.g. at about 100° C. for example, by thermal exchange with the ambient room temperature air. A difference in alkali metal vapor pressure on the two sides of the reaction zone separator results in the creation of a difference of electrical potential across the separator. As electrons flow through the external circuit, alkali metal 34 passes through plate 16 or tube 14 (i.e., the solid electrolyte) as cations which then accept electrons from electrode 20 and return to the elemental state.

If the lower part of tube 4 is maintained at a sufficiently low temperature, the alkali metal condenses there and the pressure in outer tube 4 becomes the vapor pressure of the alkali metal modified by any pressure drop produced by the mass flow of the alkali metal from conductor 20 to the cooler walls of tube 4.

In continuous operation, the condensed alkali metal in the bottom of tube 4 may be returned to the hot zone in tube 14 by a pump, not shown. If an electromagnetic pump or wick is used, the circulating alkali metal is the only moving component in the system. In general, the efficiency and power output of the device improves as the temperature in tube 14 is raised.

The solid electrolyte employed as the reaction zone separator in the devices to which the improvement of the invention applies may be a glass or polycrystalline ceramic material. Among the glasses which may be used with such devices and which demonstrate an unusually high resistance to attack by alkali metal are those having the following composition: (1) between about 47 and about 58 mole percent sodium oxide, about 0 to about 15, preferably about 3 to about 12, mole percent of aluminum oxide and about 34 to about 50 mole percent of silicon dioxide; and (2) about 35 to about 65 preferably, about 47 to about 58, mole percent sodium oxide, about 0 to about 30, preferably about 20 to about 30, mole percent of aluminum oxide, and about 20 to about 50, preferably about 20 to about 30, mole percent boron oxide. These glasses may be prepared by conventional glass making procedures using the listed ingredients and firing at temperatures of about 2700° F.

The polycrystalline ceramic materials useful as reaction zone separators of solid electrolytes are bi- or multi-metal oxide. Among the polycrystalline bi-or multi-metal oxides most useful in the devices to which the process of this invention applies are those in the family of Beta-alumina all of which exhibit a generic crystalline structure which is readily identifiable by X-ray diffraction. Thus, Beta-type-alumina or sodium Beta-type-alumina is a material which may be thought of as a series of layers of aluminum oxide held apart by columns of linear Al—O bond chains with sodium ions occupying sites between the aforementioned layers and columns. Among the numerous polycrystalline Beta-type-alumina materials useful as reaction zone separators or solid electrolytes are the following:

1. Standard Beta-type-alumina which exhibits the above-discussed crystalline structure comprising a series of layers of aluminum oxide held apart by layers of linear Al—O bond chains with sodium occupying sites between the aforementioned layers and columns. Beta-type-alumina is formed from compositions comprising at least about 80% by weight, preferably at least about 85% by weight, of aluminum oxide and between about 5 and about 15 weight percent, preferably between about 8 and about 11 weight percent, of sodium oxide. There are two well-known crystalline forms of Beta-type-alumina, both of which demonstrate the generic Beta-type-alumina crystalline structure discussed hereinbefore and both of which can easily be identified by their own characteristic X-ray diffraction pattern. Beta-alumina is one crystalline form which may be represented by the formula $Na_2O.11Al_2O_3$. The second crystalline form is $\beta''$-alumina which may be represented by the formula $Na_2O.6Al_2O_3$. It will be noted that the $\beta''$ crystalline form of Beta-type-alumina contains approximately twice as much soda (sodium oxide) per unit weight of material as does the Beta-alumina. It is the $\beta''$-alumina crystalline structure which is preferred for the formation of solid electrolyte or reaction zone separators for the device to which the improvement of this invention is applicable.

2. Boron oxide $B_2O_3$ modified Beta-type-alumina wherein about 0.1 to about 1 weight percent of boron oxide is added to the composition.

3. Substituted Beta-type-alumina wherein the sodium ions of the composition are replaced in part or in whole with other positive ions which are preferably metal ions.

4. Beta-type-alumina which is modified by the addition of a minor proportion by weight of metal ions having a valence not greater than 2 such that the modified Beta-type-alumina composition comprises a major porportion by weight of ions of aluminum and oxygen and a minor proportion by weight of a metal ion in crystal lattice combination with cations which migrate in relation to the crystal lattice as the result of an electric field, the preferred embodiment for use in such electrical conversion devices being wherein the metal ion having a valence not greater than 2 is either lithium or magnesium or a combination of lithium and magnesium. These metals may be included in the composition in the form of lithium oxide or magnesium oxide or mixtures thereof in amounts ranging from 0.1 to about 5 weight percent.

Improvement of the Invention

The improvement of the invention comprises employing as the electrode a porous, chemically vapor deposited film of a metal which has a melting point above about 1000° C and which is chemically inert to sodium. Such vapor deposited metal films are especially well-suited for use as electrodes in thermoelectric generators of the above-described type since they: (1) are good conductors of electricity: (2) permit diffusion of alkali metal perpendicular to the plane of the film; and (3) make good electrical contact with the solid electrolyte. The optimum film thickness for the electrode may be determined for any given metal by depositing the metal incrementally and measuring the electrical output of the above-mentioned thermoelectric device after each small increment of metal is deposited. Generally, however, it has been found that useful film thicknesses may vary from about 0.5 micrometers to about 10 micrometers.

Various techniques for chemically vapor depositing metals on a substrate are well-known and one skilled in the art will, without undue experimentation, determine detailed procedures which may be employed. A preferred method for depositing such films is by thermal and/or catalytic decomposition of a vapor phase carbonyl of the metal to be deposited. By employing such a deposition technique it is possible to vary the morphology of the film widely by various combinations of the deposition variables, i.e., deposition rates, substrate temperatures and total pressure.

Among the metals most suitable for use as vapor deposited electrodes in the improvement of this invention are molybdenum, tungsten, chromium, nickel and iron, with molybdenum and tungsten being most preferred. Molybdenum and tungsten are preferably deposited by the decomposition of their respective hexacarbonyls. A comprehensive discussion of the chemical vapor deposition of molybdenum and tungsten from the carbonyls is found in American Institute of Mining and Metallurical Engineers Technical Publication No. 2259 entitled "Plating Molydenum, Tungsten and Chromium by Thermal Decomposition of Their Carbonyls" by J. J. Lander and L. H. Germer.

There are many desirable properties of chemically vapor deposited molybdenum and tungsten films making them especially suitable for use in the improvement of the invention. They may be formed as soft, yielding films, minimally subject to certain mechanical failure mechanisms. The oxides of these metals are not too stable and, for this reason, these metals have relatively little tendency to reduce the material of the solid electrolyte membrane. Also, the oxides of these metals are easily reduced in hydrogen. This is convenient when trying to establish an electrical contact between the porous electrode film and a current collector system in the completed device.

Of the two most suitable metals, molybdenum is most preferred since its coefficient of expansion is close to that of beta-alumina ceramic. This results in better adhesion of the film to the electrolyte when the device is thermally cycled. Also, some molybdenum deposits have a columnar structure with an orientation favoring high permeability for sodium, while retaining nearly bulk electrical conductivity and sufficient adherence to withstand the stresses of thermal cycling. A preferred thickness for the molybdenum electrode is between about 1 and 5 micrometers.

The other three metals mentioned above as being preferred for use, while not demonstrating the most preferred characteristics of molybdenum and tungsten, still are wellsuited. Chromium, which is also discussed in the aforementioned technical publication, may be deposited by thermal decomposition of chromium hexacarbonyl or cycloheptatriene chromium tricarbonyl. Nickel may be deposition by thermal decomposition of nickel tetracarbonyl and iron by decomposition of iron pentacarbonyl.

As mentioned previously, porous films 20 may be chemically vapor deposited on the solid electrolyte surfaces by a number of techniques which will be apparent to those skilled in the art.

FIG. 2 illustrates one method by which such films may be deposited. The device of FIG. 2, as described above, is adpated such that the film of metal 20 may be applied after the cell or device is essentially completed except for the electrode. Thus, metal carbonyl vapor is passed from a plating generator 50 through conduit 52 and valve 54 into outer tube 4, conduit 52 passing through cover plate 12 in sealed relationship therewith. Conduit 52 terminates in a nozzle 56 facing tube 14. Tube 14 is heated above the decomposition temperature of the metal carbonyl by heating means 28 and the carbonyl pumped from nozzle 56 while a vacuum of $10^{-2}$ to $10^{-3}$ torr is maintained. As the metal film is deposited on the solid electrolyte tube 14 and the vapor in generator 50 depleted, additional metal carbonyl may be supplied to generator 50 through valve 58 and conduit 60.

Improved adhesion of metal film 20 to solid electrolyte 14 may be achieved if the surface of said electrolyte is made rough on a small scale. Other modifications may also be emploed if it is desired to apply the film in a pattern. For example, the solid electrolyte may be heated only in those regions where a coating is desired. Alternatively, the portion of the electrolyte on which no coating is desired may be masked with a material such as stainless steel.

The following example is presented merely as an illustration of the improvement of this invention and is not intended to be limiting.

EXAMPLE

A thermoelectric generator similar to that shown in FIG. 2 was prepared. The solid electrolyte membrane was a tube of lithia stabilized $\beta''$-alumina made with one closed end. The tube was 6 mm. O.D., and 14 cm. long with a wall thickness of 0.88 cm. The open end of the tube was sealed with glass to an alumina reservoir. Three stainless steel wells were sealed into the top of the reservoir to accommodate a thermocouple, a heater and a potential probe. The cell was filled with sodium through a copper tube which was then pinched off to seal the cell. The ceramic tube was masked with stainless steel foil exceot for a 2 cm. length near the end remote from the seal. The heater was designed to produce a high uniform temperature along this unmasked portion of the tube, and lower temperatures not exceeding 300° C at the glass seal. Temperatures along the axis of the tube were measured by sliding a close fitting thermocouple along the thermocouple well. A current buss system, not shown in FIG. 2, designed to minimize resistance losses in distributing electrons to the porous electrode comprised a molybdenum "hose" clamp secured to the tube, two strips of molybdenum metal 0.005 in. thick and 2 mm. wide welded to the hose clamp and lying flat along the surface of the tube in the electrode section and parallel to the tube axis, and a coil of 6 mil molybdenum wire wound around the tube and over the molybdenum strips. Electrical current was withdrawn from the cell by connecting a variable resistor between the copper filling tube making contact to the sodium in the reservoir and molybdenum wire on the current collector clamp. The cell potential was measured by connecting a high impedance voltmeter between an insulated molybdenum wire making contact to a stainless steel well in the middle of the unmasked section of the ceramic tube and a second molybdenum wire attached to the current collector clamp. During cell performance testing, vacuum was maintained below $5 \times 10^{-6}$ torr.

Using an apparatus similar to that shown in FIG. 2, a molybdenum electrode prepared from hexacarbonyl can be conveniently applied to the reaction zone separator surface incrementally without removing the cell from the vacuum system. A first porous electrode was prepared in this manner by heating the unmasked length of ceramic to a temperature of 500° C and admitting molybdenum hexacarbonyl to the system at such a rate that the total pressure of the system as measured by thermocouple and ionization gauges in the pump line was maintained between $10^{-2}$ and $10^{-3}$ torr. During this plating operation an electrical potential of 1.5 volts (sodium negative) was imposed between the current leads to suppress any leakage current of sodium which might otherwise flow as a result of electronic conductivity in the ceramic electrolyte. This leakage current, when present, was observed to have a deleterious effect on the quality of the molybdenum metal film. After several minutes of plating, the valve to the plating generator was closed and the system was pumped to a high vacuum. By varying the load resistor, the current-voltage characteristic of the cell was measured at a temperature of 500° C. Plating and cell voltage-current measurements were alternately continued until a near optimum thickness of plate was achieved in that further plating caused either no improvement or slightly decreased performance.

A second molybdenum electrode was prepared in the same manner as above, but at 300° C.

The performance of the first and second molybdenum electrodes was assessed from E vs log $i$ curves plotted from data obtained by discharging the device through a decade resistor box. Curves of E vs log $i$ at several temperatures are shown in FIGS. 3 and 4 for the first and second electrodes respectively where $i$ was computed as the sum of the load current and the electronic current. The curves generally approach the lines E = A—B log $i$ at low current densities which suggest that at least the linear coefficient in the relation for the pressure drop over the electrode and the voltage drop from radiation cooling were not large.

It will be understood by those skilled in the art that modifications can be made in the foregoing within the scope of the invention as hereinbefore described and hereafter claimed.

We claim:
1. In a thermoelectric generator wherein heat energy is converted to electrical energy and which comprises
   1. enclosure means for a first reaction zone;
   2. enclosure means for a second reaction zone;
   3. a reaction zone separator which
      a. separates and essentially completes enclosure of said first reaction zone and said second reaction zone and
      b. comprises a cationically-conductive, solid electrolyte that is essentially impermeable to elemental alkali metal and compounds thereof and ionically conductive with respect to cations of said alkali metal;
   4. alkali metal within said first reaction zone and in fluid communication with said solid electrolyte;
   5. an electrode within said second reaction zone in electrical contact with said solid electrolyte and sufficiently porous to permit alkali metal to pass therethrough;
   6. conduction means for electron flow between said alkali metal within said first reaction zone and said electrode in said second reaction zone;
   7. inlet means for introducing said alkali metal into said first reaction zone; and
   8. temperature control means adapted to maintain a temperature in said first reaction zone at least 100° C in excess of the lowest temperature in said second reaction zone, wherein the improvement comprises employing as said electrode a porous film of a metal which is selected from the group consisting of molybdenum, tungsten, chromium, nickel and iron, said film having been deposited on said reaction zone separator in a thickness of between about 0.5 and about 10 micrometers by chemical vapor deposition.

2. A device in accordance with claim 1 wherein said metal is deposited on said reaction zone separator by thermally decomposing a vapor phase carbonyl of said metal.

3. A device in accordance with claim 2, wherein said metal is molybdenum which has been deposited by thermally decomposing a vapor of molybdenum hexacarbonyl.

4. A device in accordance with claim 2, wherein said metal is tungsten which has been deposited by thermally decomposing a vapor of tungsten hexacarbonyl.

5. A device in accordance with claim 2 wherein said metal is chromium which has been deposited by thermally decomposing a vapor of either chromium hexacarbonyl or cycloheptatriene chromium tricarbonyl.

6. A device in accordance with claim 2 wherein said metal is nickel which has been deposited by thermally decomposing nickel tetracarbonyl.

7. A device in accordance with claim 12 wherein said metal is iron which has been deposited by thermally decomposing iron pentacarbonyl.

8. A device in accordance with claim 2 wherein said metal film has been applied to said reaction zone separator after preparation of said thermoelectric generator cell by evacuating gases and air from said second reaction zone, heating said reaction zone separator to a temperature above the decomposition temperature of said methyl carbonyl and passing said vapor into said cell and over said separator so as to deposit a film of said metal on said reaction zone separator.

9. A device in accordance with claim 3, wherein said molybdenum film is deposited to a thickness of between about 1 and about 5 micronmeters.

10. In a process for manufacturing a thermoelectric generator wherein heat energy is converted to electrical energy, which device comprises
  1. enclosure means for a first reaction zone;
  2. enclosure means for a second reaction zone;
  3. a reaction zone separator which
    a. separates and essentially completes enclosure of said first reaction zone and said second reaction zone and
    b. comprises a cationically-conductive, solid electrolyte that is essentially impermeable to elemental alkali metal and compounds thereof and ionically conductive with respect to cations of said alkali metal;
  4. alkali metal with said first reaction zone and in fluid communication with said solid electrolyte;
  5. an electrode with said second reaction zone in electrical contact with said solid electrolyte and sufficiently porous to permit alkali metal to pass therethrough;
  6. conduction means for electron flow between said alkali metal within said first reaction zone and said electrode in said second reaction zone;
  7. inlet means for introducing said alkali metal into said first reaction zone; and
  8. temperature control means adapted to maintain temperature in said first reaction zone at least 100° C in excess of the lowest temperature in said second reaction zone, wherein the improvement comprises forming said electrode in electrical contact with said solid electrolyte by depositing a porous film of a metal in a thickness of between about 0.5 and about 10 micrometers by thermally decomposing a vapor phase carbonyl of said metal, said metal being selected from the group consisting of molybdenum, tungsten, chromium, nickel and iron.

11. A process in accordance with claim 10 wherein said metal is molybdenum which is deposited by thermally decomposing a vapor of molybdenum hexacarbonyl.

12. A process in accordance with claim 10 wherein said metal is tungsten which is deposited by thermally decomposing a vapor of tungsten hexacarbonyl.

13. A process in accordance with claim 10 wherein said metal is chromium which is deposited by thermally decomposing a vapor of either chromium hexacarbonyl or cycloheptatriene chromium tricarbonyl.

14. A process in accordance with claim 10 wherein said metal is nickel which is deposited by thermally decomposing nickel tetracarbonyl.

15. A process in accordance with claim 10 wherein said metal is iron which is deposited by thermally decomposing iron pentacarbonyl.

16. A process in accordance with claim 10 wherein said metal film is applied to said solid electrolyte before said reaction zone separator is installed in said cell.

17. A process in accordance with claim 10 wherein said metal film is applied to said reaction zone separator in said thermoelectric generator by evacuating gases and air from said second reaction zone, heating said reaction zone separator to a temperature above the decomposition temperature of said metal carbonyl and passing said vapor into said cell and over said separator so as to deposit a film of said metal on said reaction zone separator.

18. A process in accordance with claim 17 wherein said reaction zone separator is selectively heated such that only the surfaces of the separator on which said metal film is to be deposited are maintained above the decomposition temperature of said vapor.

19. A process in accordance with claim 17 wherein said cell is heated by means of an internal heater within said first reaction zone.

20. A process in accordance with claim 17 wherein that portion of said reaction zone separator on which no metal film is to be deposited is masked to avoid thermal decomposition of said vapor thereon.

21. A process in accordance with claim 10 wherein said reaction zone separator is roughened prior to the vapor deposition of said metal thereon.

22. A process in accordance with claim 11, wherein said molybdenum film is deposited to a thickness of between about 1 and about 5 micrometers.

* * * * *